US008388729B2

(12) United States Patent
Welham et al.

(10) Patent No.: US 8,388,729 B2
(45) Date of Patent: Mar. 5, 2013

(54) METHOD FOR AMMONIACAL LEACHING

(75) Inventors: Nicholas J. Welham, Ballart (AU);
Garry M. Johnston, Claremont (AU);
Matthew L. Sutcliffe, London (GB)

(73) Assignee: Metaleach Limited, Tortola (VG)

( * ) Notice: Subject to any disclaimer, the term of this patent is extended or adjusted under 35 U.S.C. 154(b) by 529 days.

(21) Appl. No.: 12/668,917

(22) PCT Filed: Jul. 11, 2008

(86) PCT No.: PCT/AU2008/001027
§ 371 (c)(1),
(2), (4) Date: Jan. 13, 2010

(87) PCT Pub. No.: WO2009/009825

PCT Pub. Date: Jan. 22, 2009

(65) Prior Publication Data
US 2010/0180728 A1    Jul. 22, 2010

(30) Foreign Application Priority Data

Jul. 13, 2007 (AU) ................................. 2007903815
Nov. 15, 2007 (AU) ................................. 2007906262

(51) Int. Cl.
    C22B 3/14 (2006.01)
(52) U.S. Cl. .......................................... 75/743; 423/33
(58) Field of Classification Search ............... 75/743; 423/33
    See application file for complete search history.

(56) References Cited

U.S. PATENT DOCUMENTS 2,086,570 A * 7/1937 Meyer .............................. 423/53
4,165,264 A    8/1979 Satchell, Jr.
4,324,764 A * 4/1982 Hasegawa et al. ............ 422/159

FOREIGN PATENT DOCUMENTS

| CA | 2072714    | 1/1993  |
| GB | 715243     | 9/1954  |
| GB | 1168858    | 10/1969 |
| JP | 63-086824  | 4/1988  |
| WO | 2004/055225 | 7/2004 |
| WO | 2004/067787 | 8/2004 |

OTHER PUBLICATIONS

International Search Report and Written Opinion for PCT/AU2008/001027, mailed on Sep. 18, 2008.
Arbiter, Nathaniel, et al., "Ammonia Leaching of Copper Sulfide Concentrates", *Proceedings of Copper 99-Cobre 99 International Conference*, vol. IV, 1999, pp. 197-212.
Bingol, D., et al., "Dissolution Kinetics of Malachite in Ammonia/Ammonium Carbonate Leaching", *Hydrometallurgy*, vol. 76 (1-2), 2005, pp. 55-62.

(Continued)

*Primary Examiner* — George Wyszomierski
*Assistant Examiner* — Tima M McGuthry Banks
(74) *Attorney, Agent, or Firm* — Pillsbury Winthrop Shaw Pittman LLP

(57) ABSTRACT

In accordance with the present invention there is provided a method for leaching one or more target metals from an ore, the method comprising the method steps of: curing the ore to be leached through the application of an aqueous solution of a curing agent, producing a cured ore; leaching the cured ore at atmospheric pressure through the application of an ammonium carbonate solution containing free ammonia, producing a pregnant leach solution; and passing the pregnant leach solution to a means for metals recovery.

15 Claims, 1 Drawing Sheet

OTHER PUBLICATIONS

Bouffard, Sylvie C., "Agglomeration for Heap Leaching: Equipment Design, Agglomerate Quality Control, and Impact on the Heap Leach Process", *Minerals Engineering*, vol. 21, No. 15, 2008, pp. 1115-1125.

Chuanhui, Xu, et al., "Ammonia Leaching: An Alternate Route for Copper Recovery", *Minprex 2000*, AusIMM, Sep. 11-13, 2000, pp. 241-248.

Duyvesteyn, Willem P.C., et al., "The Escondida Process for Copper Concentrates", *Extractive Metallurgy of Copper, Nickel, and Cobalt*, vol. I, 1993, pp. 881-910.

Forward, F. A., et al., "Chemistry of the Ammonia Pressure Process for Leaching Ni, Cu, and Co from Sherritt Gordon Sulphide Concentrates", *Journal of Metals*, Mar. 1955, pp. 457-463.

Frenay, Jean, "Leaching of Oxidized Zinc Ores in Various Media", *Hydrometallurgy*, vol. 15, No. 2, 1985, pp. 243-253.

Ghosh, M. K., et al., "Effect of Dissolved Impurities During Ammonia Leaching of Pure Zinc Sulphide", *Hydrometallurgy*, vol. 21, 1989, pp. 207-221.

Groves, R. D., et al., "Leaching Coarse Native Copper Ore With Dilute Ammonium Carbonate Solution", *Solution Mining Symposium 1974*, 1974, pp. 381-389.

Harvey, T. G., "The Hydrometallurgical Extraction of Zinc by Ammonium Carbonate: A Review of the Schnabel Process", *Mineral Processing and Extractive Metallurgy Review*, vol. 27, No. 4, 2006, pp. 231-279.

Kunkul, A., et al., "Leaching Kinetics of Malachite in Ammonia Solutions", *International Journal of Mineral Processing*, vol. 41, Nos. 3-4, 1994, pp. 167-182.

Lewandowski, K. A., et al., "Binders for Heap Leaching Agglomeration", *Minerals & Metallurgical Processing* vol. 26, No. 1, Feb. 2009, pp. 1-24.

Moats, Michael S., et al., "The Art and Science of Crushed Ore Agglomeration for Heap Leaching", *Hydrometallurgy*, Proceedings of the 6th International Symposium, 2008, pp. 912-917.

Oudenne, Paul D., et al., "Leaching Kinetics of Malachite in Ammonium Carbonate Solutions", *Metallurgical Transactions B*, vol. 14B, No. 1, Mar. 1983, pp. 33-40.

\* cited by examiner

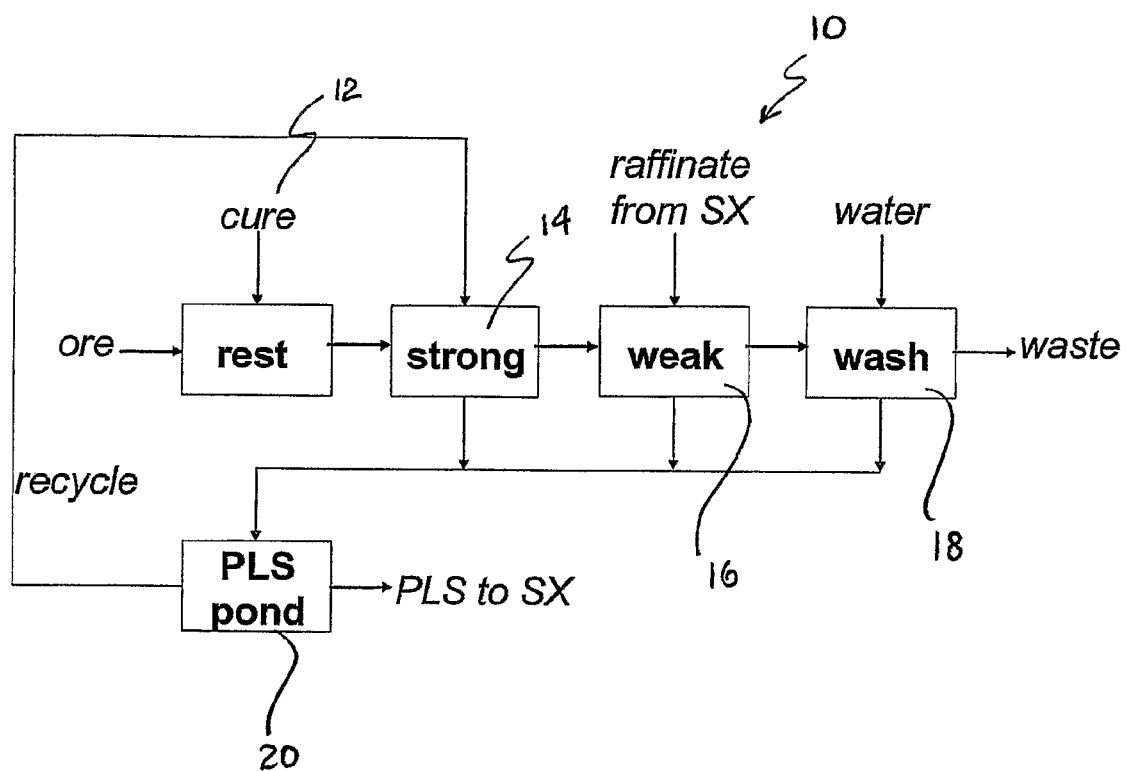

METHOD FOR AMMONIACAL LEACHING

CROSS REFERENCE TO RELATED APPLICATIONS

This is the U.S. National Phase of PCT/AU2008/001027, filed Jul. 11, 2008, which in turn claims priority to Australian application number AU2007903815 filed Jul. 13, 2007 and AU2007906262 filed Nov. 15, 2007, each of which are incorporated herein in their entirety by reference.

FIELD OF THE INVENTION

The present invention relates to a method for leaching. More particularly, the method for leaching of the present invention utilises an ammoniacal media.

BACKGROUND ART

Many prior art reports of ammoniacal leaching have used tank or vat leaching, in which the ore or concentrate is simply immersed directly into ammoniacal solution.

In the case of copper, these previous processes have been reported as failures (e.g. Arbiter process, Escondida, as discussed in Arbiter & McNulty, Copper '99, p. 197-212). Specifically, the failure of the Arbiter process is attributed to poor removal of sulphate ions from solution by a lime boil, the leach kinetics being too slow even at the elevated temperature of 75-100° C. due to lower operating oxygen pressure (138 kPa) than ideal (690 kPa) and a lower (2:1) weight ratio of ammonia to copper than ideal (3.5:1). The failure of the Escondida process is attributed to insufficient retention time due to slower than expected kinetics, steam recovery of ammonia being more difficult than expected, solid-liquid separation after leaching being ineffective, ammonia being extracted by the LIX54 solvent extraction reagent used. Largely as a result of these difficulties, the plant never reached design capacity.

For zinc, the Schnabel process was used for a number of years before being superseded by the more environmentally friendly acid-based roast-leach-electrowin process. The Schnabel process feed was typically roasted sphalerite flotation concentrate but selective mining also allowed processing of zinc oxide ores. The Schnabel process is complex (as is evident from the summary by Harvey (Mineral Processing & Extractive Metallurgy Review, volume: 27, pages: 231-279, 2006), and it is perhaps unsurprising that there are no Schnabel process plants in operation.

A similar process has also been used for the refining of nickel and cobalt. The major difference is that the nickeliferous feedstock has been prepared either by reductive roasting (Caron process) or by chemical precipitation from an acid solution (e.g. pressure acid leach plants such as Moa Bay, Murrin Murrin, etc). These processes share several common features Elevated leaching temperature, typically in excess of 30° C.

Leaching solution concentrations of >50 g/L ammonia

Pregnant leach solution concentrations of >50 g/L metal

Use of steam to strip and recover both ammonia and carbon dioxide

Further, the well known Sherritt-Gordon process for nickel matte dissolves >80% nickel matte in ammoniacal solutions but only after leaching at >120° C. under >5 atm of oxygen pressure, which is obviously highly energy intensive.

Although many methods for ammoniacal leaching are described in the literature, including the patent literature, all require one or more of multiple leaching stages, energy-intensive pre-treatment of the ore (for example roasting or grinding) and/or elevated leach temperatures and/or pressures. These requirements necessitate complicated engineering and significant energy consumption, so it is little surprise that none have been widely adopted.

Further, many ammoniacal leaching methods either suffer from significant ammonia loss, or require complicated chemistry or engineering to overcome such, providing a further impediment to the widespread adoption of ammoniacal leaching methods.

Ammoniacal leaching is particularly attractive for high carbonate ores, which are generally not amenable to acid leaching-based processes for economic reasons. However, the scope of the present invention is not limited to high carbonate ores.

The method of leaching of the present invention has as one object thereof to overcome the abovementioned problems associated with the prior art, or to at least provide a useful alternative thereto.

Throughout this specification, unless the context requires otherwise, the word "comprise", or variations such as "comprises" or "comprising", will be understood to imply the inclusion of a stated integer or group of integers but not the exclusion of any other integer or group of integers.

The discussion of the background art is included exclusively for the purpose of providing a context for the present invention. It should be appreciated that the discussion is not an acknowledgement or admission that any of the material referred to was common general knowledge in the field relevant to the present invention in Australia or elsewhere before the priority date.

DISCLOSURE OF THE INVENTION

In accordance with the present invention there is provided a method for leaching one or more target metals from an ore, the method comprising the method steps of:

curing the ore to be leached through the application of an aqueous solution of a curing agent, producing a cured ore;

leaching the cured ore at atmospheric pressure through the application of an ammonium carbonate solution containing free ammonia, producing a pregnant leach solution; and passing the pregnant leach solution to a means for metals recovery.

Throughout this specification, unless the context requires otherwise, the term "ore" or variations thereof, will be understood to include, for example, the product of one or more pre-treatment steps, such as a roast or calcination steps, or one or more concentration steps, but is not limited thereto.

Curing

The inventors have discovered that an aqueous curing step is capable of rendering an ore amenable to effective leaching by an ammonium carbonate solution containing free ammonia at atmospheric pressure, without the need for conventional physical pre-treatments such as roasting or grinding, thereby offering significant energy savings. As is evident from the preceding definition of ore, the scope of the present invention should not be understood to exclude ores that have been pre-treated by conventional methods, and in such circumstances, the method of the present invention may afford better recoveries than conventional methods. In many cases, the improved recoveries afforded by the method of the invention may render an ore body commercially viable.

As would be understood by a person skilled in the art, the term curing is fundamentally distinct from leaching. Leaching describes a process by which a solution containing a leaching agent is contacted with an ore, the solution recovered and valuable metals extracted therefrom. The curing step of the present invention renders the ore to be leached more amenable to the leaching process, improving both the extent and rate of recovery of the target metal. Without wishing to be bound by theory, this may arise from one or more of the oxidation or reduction of the target metal or otherwise refractory ores containing the target metal, the complexation of metal (target or non-target) and the mobilisation of metal (target or non target).

The scope of the present invention encompasses methods where the aqueous solution of the curing agent is collected after the step of curing the ore to be leached through the application of an aqueous solution of a curing agent, and metal values recovered therefrom. However, conventional aqueous leaching solutions do not fall within the meaning of aqueous solution of a curing agent, as they do not render the ore to be leached more amenable to the subsequent leaching process. For example, two stage ammoniacal leaching processes differ markedly from the method of the present invention as there is no enhancement of the second leaching stage by performance of the first.

However, in a preferred form of the invention, the step of curing the ore to be leached through the application of an aqueous solution of a curing agent more specifically comprises substantially retaining the curing agent in contact with the ore to be leached when the ammonium carbonate solution containing free ammonia is added. As would be understood by a person skilled in the art, in many applications, it is virtually impossible to completely retain a solution in contact with the ore to be leached. For example, in a heap leaching context, it is virtually impossible to stop drainage from the ore.

Curing Agents: General

The nature and concentration of the curing agent depends on the identity of the target metal, the mineralogy of the ore, the texture of the ore and the pore volume of the ore.

As would be understood by a person skilled in the art, the term texture describes the manner in which the minerals are arranged in the ore (e.g. goethite coating zinc oxide minerals is a very different proposition to a zinc oxide ore with associated goethite).

Throughout this specification, unless the context requires otherwise, the phrases "pore space" and "pore volume" refer to the space comprising the pores within the ore particles, as opposed to inter-particle pores created by any stacking process.

In one form of the invention, the curing agent is selected from the group: oxidising agent, reducing agent, acid, base and metal complexing agent.

Curing Conditions: General

Further, and similarly, the most desirable conditions under which the ore is cured vary as the composition, mineralogy and texture of the ore varies. For example, the nature and concentration of the curing agent, the temperature at which the curing step occurs, the pH at which the curing step occurs and the time for which the ore is exposed to the curing agent may all be varied in response to the composition, mineralogy, texture and pore volume of the ore (with low pore volumes necessitating higher concentrations). In general however, the higher the concentration of the targeted mineral in the ore, the higher the concentration of the solution used in the curing step.

The curing agent may be an agent previously associated with leaching the metal of interest from the ore. In such cases, the concentration of the curing agent in the aqueous solution of the curing agent will typically be substantially higher than the concentrations conventionally associated with leaching the metal of interest from the ore to render the ore to be leached more amenable to the leaching process.

In a highly preferred form of the invention, the step of curing the ore to be leached takes place at atmospheric pressure.

In a highly preferred form of the invention, the step of curing the ore to be leached takes place at ambient temperature.

The volume of the aqueous solution of the curing agent applied to the ore is a function of a number of parameters including, but not limited to, the texture of the ore, the residence time (the time for which the ore is exposed to the curing agent prior to the leaching step), the concentration of the curing agent and the leach conditions. However, in preferred embodiments of the invention, the volumes of aqueous solutions of curing agent exposed to the ore are as low as practicable. That is, preferred forms of the invention utilise low volumes of an aqueous solution of a curing agent of high concentration, and preferred methods for curing the ore to be leached through the application of an aqueous solution of a curing agent are those adapted to utilise low volumes of aqueous solution of the curing agent.

Although the identity of the curing agent, the volume and concentration of the aqueous solution of the curing agent, and the conditions under which the curing step takes place will differ for different ores, the present invention identifies a principle enabling the economical recovery of a wide range of target metals from a wide range of ores, in that conventional, energy-intensive physical pre-treatment techniques such as grinding or roasting, used successfully or otherwise in ammoniacal leaching, can be replaced or enhanced by using chemical curing techniques, where combinations of the activity of the curing agent and elevated concentrations of the curing agent render the ore amenable to the subsequent atmospheric ammoniacal leaching.

Aqueous solutions of curing agents are preferably low volumes of high concentration solutions. In a preferred form of the invention, the aqueous solution of the curing agent is at least 10% of the saturated concentration of the curing agent under the prevailing conditions. Preferably still, the aqueous solution of the curing agent is at least 20% of the saturated concentration of the curing agent under the prevailing conditions. Preferably still, the aqueous solution of the curing agent is at least 30% of the saturated concentration of the curing agent under the prevailing conditions. Preferably still, the aqueous solution of the curing agent is at least 40% of the saturated concentration of the curing agent under the prevailing conditions. Preferably still, the aqueous solution of the curing agent is at least 50% of the saturated concentration of the curing agent under the prevailing conditions. Preferably still, the aqueous solution of the curing agent is at least 60% of the saturated concentration of the curing agent under the prevailing conditions. Preferably still, the aqueous solution of the curing agent is at least 70% of the saturated concentration of the curing agent under the prevailing conditions. Preferably still, the aqueous solution of the curing agent is at least 80% of the saturated concentration of the curing agent under the prevailing conditions. Preferably still, the aqueous solution of the curing agent is at least 90% of the saturated concentration of the curing agent under the prevailing conditions.

Curing Conditions: Application of Curing Agent to the Ore

The aqueous solution of the curing agent may be generated in situ, such as by electrolytic means.

In one form of the invention, the step of curing the ore to be leached through the application of an aqueous solution of a curing agent more specifically comprises:

spraying the aqueous solution of the curing agent onto the ore prior to the step of leaching the cured ore at atmospheric pressure through the application of an ammonium carbonate solution containing free ammonia.

The method of the present invention may include the step of:

reducing the size of the ore to be leached by grinding.

In a particular form of the invention, the method of the present invention includes the step of:

reducing the size of the ore to be leached by wet grinding, wherein the ore is ground in contact with water or an aqueous grinding solution.

Where the invention comprises reducing the size of the ore to be treated by wet grinding, wherein the ore is ground in contact with water or a grinding aqueous solution, the aqueous grinding solution may be provided in the form of the aqueous solution of the curing agent.

In one form of the invention, the method comprises the steps of:

grinding the ore in an aqueous solution of a curing agent, thereby curing the ore to be leached through the application of an aqueous solution of a curing agent;

resting the ore for a predetermined period; then leaching the cured and rested ore at atmospheric pressure through the application of an ammonium carbonate solution containing free ammonia to produce a pregnant leach solution; and passing the pregnant leach solution to a means for metals recovery.

The method of the present invention may include a step of:

reducing the size of the ore to be leached by crushing.

In a particular form of the invention, the method of the present invention includes the step of:

reducing the size of the ore to be leached by wet crushing, wherein the ore is crushed in contact with water or an aqueous crushing solution.

Where the invention comprises reducing the size of the ore to be treated by wet crushing, wherein the ore is crushed in contact with water or an aqueous crushing solution, the aqueous crushing solution may be provided in the form of the aqueous solution of the curing agent.

In one form of the invention, the method comprises the steps of:

crushing the ore in an aqueous crushing solution of a curing agent thereby curing the ore to be leached through the application of an aqueous solution of a curing agent;

resting the ore for a predetermined period; then leaching the cured and rested ore at atmospheric pressure through the application of an ammonium carbonate solution containing free ammonia to produce a pregnant leach solution; and passing the pregnant leach solution to a means for metals recovery.

In one form of the invention, the step of curing the ore to be leached through the application of an aqueous solution of a curing agent more specifically comprises:

stacking the ore to form a heap;

irrigating the surface of the heap with the aqueous solution of the curing agent such that the aqueous solution of the curing agent percolates down through the heap;

resting the ore for a predetermined period, prior to the step of leaching the cured ore at atmospheric pressure through the application of an ammonium carbonate solution containing free ammonia.

In one form of the invention, the step of curing the ore to be leached through the application of an aqueous solution of a curing agent more specifically comprises:

immersing the ore in an aqueous solution of the curing agent for a sufficient time such that the curing solution infiltrates a desired fraction of pore volume;

resting the ore for a predetermined period prior to the step of leaching the cured ore at atmospheric pressure through the application of an ammonium carbonate solution containing free ammonia.

The method of the present invention may include a step of:

agglomerating the ore to be leached.

In a particular form of the invention, the method of the present invention includes the step of:

agglomerating the ore to be leached by contacting the ore with water or an aqueous solution of an agglomerating agent.

In one form of the invention, the aqueous solution of the curing agent is also the aqueous solution of the agglomerating agent. That is, the aqueous solution contains both a curing agent and an agglomerating agent. In one form of the invention, the curing agent is an agglomerating agent, such that the step of curing the ore to be leached through the application of an aqueous solution of a curing agent more specifically comprises:

agglomerating the ore with the aqueous solution of the curing agent;

resting the ore for a predetermined period prior to the step of leaching the cured ore at atmospheric pressure through the application of an ammonium carbonate solution containing free ammonia.

In one form of the invention, the step of curing the ore to be leached through the application of an aqueous solution of a curing agent more specifically comprises:

spraying the aqueous solution of the curing agent onto the ore; and resting the ore for a predetermined residence time, prior to the step of leaching the cured ore at atmospheric pressure through the application of an ammonium carbonate solution containing free ammonia.

In a particular form of the invention, the method of the present invention comprises the step of:

agglomerating the ore to be treated by contacting the ore with a >500 g/L sulphuric acid solution.

The predetermined time for which the ore is rested prior to the step of leaching the cured ore at atmospheric pressure through the application of an ammonium carbonate solution containing free ammonia will be a function of a number of parameters including, but not limited to the particle size of the ore, the concentration of the curing agent and the texture of the ore.

In preferred forms of the invention, the predetermined period is between 5 minutes and fourteen days. Preferably still, the predetermined period is between 1 day and 7 days. A person skilled in the art will realise that the curing time will be a function of particle size, small particles requiring substantially less curing time than large particles. A person skilled in the art will realise that a high concentration of curing agent will require a shorter resting time than a low concentration of curing agent.

The ideal extent of saturation of the pore space of the ore with the aqueous solution of the curing agent will depend largely on the texture of the ore. Preferably the step of curing the ore to be leached through the application of an aqueous solution of a curing agent saturates at least 50% of the pore space with solution. Preferably still, the step of curing the ore to be leached through the application of an aqueous solution of a curing agent saturates at least 60% of the pore space with solution. Preferably still, the step of curing the ore to be leached through the application of an aqueous solution of a curing agent saturates at least 70% of the pore space with solution. Preferably still, the step of curing the ore to be leached through the application of an aqueous solution of a curing agent saturates at least 80% of the pore space with solution. Preferably still, the step of curing the ore to be leached through the application of an aqueous solution of a curing agent saturates at least 90% of the pore space with solution.

Leaching: Pressure and Temperature

The most desirable conditions under which the cured ore is leached will vary as the conditions under which the ore is cured vary. For example, weaker cure solutions may require more aggressive leach solutions.

Methods for leaching ore at atmospheric pressure are well known to persons skilled in the art, and include heap leaching, vat leaching, tank leaching and dump leaching. In preferred forms of the invention, the step of leaching the cured ore at atmospheric pressure through the application of an ammonium carbonate solution containing free ammonia, producing a pregnant leach solution takes place at ambient temperatures. Atmospheric leaching, particularly at ambient temperatures, is one of the least energy-intensive leaching techniques available. A curing step that is not energy intensive and that renders an ore amenable to an ammoniacal leaching step that is also not energy intensive has clear advantages over prior art methods.

Leaching: Ammonium Carbonate Solution Containing Free Ammonia

Ammonium Carbonate

Ammonium carbonate fixes the operating pH to a relatively narrow range and is, to some extent, self-regulating as the ammonium carbonate acts as a buffer. Importantly, the pH range buffered by the ammonium carbonate is a range in which a wide variety of target metals are soluble. A second advantage of carbonate systems is that there is less prospect of gypsum scaling as the sulphate level is always too low for precipitation to occur. The calcium level will also be low as the precipitation of $CaCO_3$ will occur whenever calcium ions are released into solution.

Preferably, the ammonium carbonate concentration of the ammonium carbonate solution containing free ammonia is sufficient to prevent the pH decreasing below 8 during the step of leaching the cured ore at atmospheric pressure through the application of an ammonium carbonate solution containing free ammonia, producing a pregnant leach solution. Preferably, the ammonium carbonate concentration of the ammonium carbonate solution containing free ammonia is at least 1 g/L. Preferably still, the concentration of ammonium carbonate is at least 5 g/L. Preferably still, the ammonium carbonate concentration of the ammonium carbonate solution containing free ammonia is at least 8 g/L. Preferably still, the ammonium carbonate concentration of the ammonium carbonate solution containing free ammonia is at least 10 g/L. Preferably still, the ammonium carbonate concentration of the ammonium carbonate solution containing free ammonia is at least 20 g/L. Preferably still, the ammonium carbonate concentration of the ammonium carbonate solution containing free ammonia is at least 30 g/L. Preferably, the ammonium carbonate concentration of the ammonium carbonate solution containing free ammonia is between 1 g/L and 500 g/L. Preferably still, the concentration of ammonium carbonate is between 5 g/L and 500 g/L. Preferably still, the ammonium carbonate concentration of the ammonium carbonate solution containing free ammonia is between 8 g/L and 500 g/L. Preferably still, the ammonium carbonate concentration of the ammonium carbonate solution containing free ammonia is between 10 g/L and 500 g/L. Preferably still, the ammonium carbonate concentration of the ammonium carbonate solution containing free ammonia is between 20 g/L and 500 g/L. Preferably still, the ammonium carbonate concentration of the ammonium carbonate solution containing free ammonia is between 30 g/L and 500 g/L.

Preferably, where the target metal is copper, the ammonium carbonate concentration of the solution is about 20 g/L ammonium carbonate.

Ammonia

The ammonia of the ammonium carbonate solution containing free ammonia may be generated in situ, such as by hydrolysis of urea.

The free ammonia concentration of the ammonium carbonate solution containing free ammonia may be tailored to the rate at which the target metal is leached from the cured ore, thereby minimising excess free ammonia and thus minimising ammonia losses due to evaporation. Specifically, the resulting pregnant leach solution preferably contains only a slight excess of free ammonia over that necessary to retain the target metal in solution. As there is little free ammonia in the pregnant leach solution, ammonia losses due to evaporation are low. This is one of the major potential advantages of the present invention.

A person skilled in the art will readily be able to calculate the free ammonia concentration required to retain a particular target metal in solution at a desired concentration. The conditions under which ammoniacal complexes of various target metals form are readily calculable based on data contained in NIST Standard Reference Database 46, NIST Critically Selected Stability Constants of Metal Complexes Version 6.0, the contents of which are incorporated by reference.

For example, where the target metal is copper, the ammonia solution applied in step (b) is about 10 to 15 g/L ammonia.

For example, where the target metal is zinc and the ore contained 18.2% zinc in a rapidly leaching form ammonium carbonate solution containing free ammonia comprises about 30-70 g/L ammonia.

As would be realised by a person skilled in the art the level of ammonia in the solution applied in step (b) would be matched to the level of target metal in the ore and the rate at which it leaches. A low grade ore where the target metal leaches slowly would require a lower concentration of ammonia than a high grade ore where the leaching is rapid.

Leaching: Multiple Target Metals

The present invention encompasses simultaneously leaching more than one target metal. The target, metals may be separated by the means for metal recovery, such as by solvent extraction, precipitation, ion exchange or cementation.

Curing Agents: Specific Target Metals and Ores

As stated in the context of the preceding general discussion of curing agents, generally above, the nature of the curing agent depends on the identity of the target metal, the mineralogy of the ore, the texture of the ore and the pore volume of the ore.

A person skilled in the art will use either single curing agents or a suite of curing agents within the same cure solution according to identity of the target metal, the mineralogy of the ore, the texture of the ore and the pore volume of the ore. Some curing agents are chemically compatible, and may be applied simultaneously. Others may necessitate sequential curing. That is, the step of curing the ore to be leached through the application of an aqueous solution of a curing agent, producing a cured ore may comprise the steps of:

curing the ore to be leached through the application of a first aqueous solution of a first curing agent; then further curing the ore to be leached through the application of a second aqueous solution of a second curing agent.

Examples of chemically incompatible curing agents include acids and bases. Specifically, in one form of the invention, the first curing agent may be provided in the form of an acid, and the second curing agent in the form of ammonia.

In one form of the invention, the curing agent is selected from the group: oxidising agent, reducing agent, and/or metal complexing agent.

Some curing agents, such as oxidising agents, may confer the additional benefit of oxidising organic contaminants of the ore that would otherwise consume a portion of the ammonia in the leach solution. Advantageously, where the ore contains an ammonia-consuming contaminant, the curing agent may comprise an oxidising agent.

Further, the curing agent of the present invention need not act directly on the target metal. For example, where the ore is a nickel and/or cobalt oxide where the nickel and/or cobalt is present in a limonite, saprolite or nontronite and the target metal is nickel and/or cobalt, the curing agent may reduce the iron in the limonite, saprolite or nontronite releasing nickel and/or cobalt. As a further example, where the ore is a zinc silicate and the target metal is zinc, the curing agent may be provided in the form of an aqueous fluoride solution which may complex the silica.

Where the target metal is copper, the curing agent is preferably an oxidising agent. Where the target metal is nickel and/or cobalt, the curing agent is preferably a reducing agent. Where the target metal is zinc, the curing agent is preferably a zinc-complexing agent. In a highly preferred form of the invention, where the target metal is copper, the curing agent preferably comprises an oxidising agent and a complexing agent. In a highly preferred form of the invention, where the target metal is nickel and/or cobalt, the curing agent preferably comprises a reducing agent and a complexing agent.

In a preferred form of the invention, where the ore is an oxide ore of copper and the target metal is copper, the curing agent is ammonia. Preferably still the ammonia concentration of the aqueous solution of the curing agent is at least 30 g/L. Preferably, where the target metal is copper, the ammonia solution applied in the curing step is at least about 60 g/L ammonia.

Curing Agent: Oxide Ores

In a preferred form of the invention, where the ore is an oxide ore, the curing agent is selected from the group: reducing agent, metal complexing agent, acid, base and combinations thereof. In a preferred form of the invention, where the ore is an oxide ore, the curing agent is selected from the group: reducing agent, metal complexing agent and combinations thereof. In a preferred form of the invention, where the ore is an oxide ore, the curing agent is selected from the group: metal complexing agent and a combination of reducing agent and metal complexing agent.

Where the ore is a zinc and lead oxide ore and the target metals are zinc and lead, the curing agent is preferably both ammonia and citrate. Without wishing to be bound by theory, ammonia may mobilise the zinc and citrate may mobilise the lead to enhance subsequent leaching.

Where the ore is a copper oxide ore containing an ammonia-consuming component, such as organic matter, and the target metal is copper, the curing agent advantageously comprises ammonia and an oxidising agent. The oxidising agent may be selected from the group: hypochlorite, nitrate, chlorate, perchlorate, hydrogen peroxide, calcium peroxide, ferric, cupric. In preferred forms, the concentration of the oxidising agent is at least of 5 g/L. However, some ores may be advantageously cured by oxidising agent concentrations as low as 1 g/L. Preferably, the concentration of the ammonia is at least 30 g/L. However, some ores may be advantageously cured by ammonia concentrations as low as 1 g/L.

Where the ore is an oxide of zinc in the form of smithsonite and the target metal is zinc, the curing agent is preferably provided in the form of ammonia. Preferably, the concentration of the ammonia in the aqueous solution of the curing agent is at least 30 g/L. However, some ores may be advantageously cured by ammonia concentrations as low as 1 g/L.

Where the ore is an oxide of zinc in the form of hemimorphite, and the target metal is zinc, the curing agent preferably comprises ammonia and $CO_2$. Preferably, the concentration of the ammonia is at least 30 g/L. Preferably, the concentration of the $CO_2$ is at least 20 g/L. However, some ores may be advantageously cured by ammonia concentrations as low as 1 g/L and/or $CO_2$ concentrations as low as 1 g/L.

Where the ore is an oxide of zinc in the form of zincite and/or hydrozincite, and the target metal is zinc, the curing agent is preferably provided in the form of an ammonia solution. Preferably, the concentration of the ammonia solution is at least 30 g/L. However, some ores may be advantageously cured by ammonia concentrations as low as 1 g/L.

Where the ore is an oxide of zinc with a goethite coat, and the target metal is zinc, the aqueous solution of the curing agent preferably comprises one or more of: oxalic acid, citric acid, ascorbic acid, sodium dithionite, sulfuric acid and/or HCl, preferably at a concentration of at least 1 g/L.

Where the ore is an oxide of zinc containing chalcophane, and the target metal is zinc, the aqueous solution of the curing agent preferably comprises on or more of: ascorbic acid, sodium dithionite, sulfuric acid and/or HCl, preferably at a concentration of at least 1 g/L.

Where the ore is an oxide of molybdenum, and the target metal is molybdenum, the curing agent is preferably provided in the form of ammonia. Preferably, the concentration of the ammonia in the aqueous solution of the curing agent is at least 30 g/L. However, some ores may be advantageously cured by ammonia concentrations as low as 1 g/L.

Where the ore is an oxide of molybdenum containing $MoS_2$, and the target metal is molybdenum, the curing agent is preferably provided in the form of ammonia and an oxidising agent. Preferably, the concentration of the ammonia solution is in excess of 30 g/L. However, some ores may be advantageously cured by ammonia concentrations as low as 1 g/L. The oxidising agent may be selected from the group: hypochlorite, nitrate, chlorate, perchlorate, hydrogen peroxide, calcium peroxide, ferric, cupric. Preferably, the concentration of the ammonia in the aqueous solution of the curing agent is at least 30 g/L. The concentration of the oxidising agent varies with the amount of sulfide present in the ore. For ores containing significant sulfide concentrations, concentrations of oxidising agent of at least 25 g/L are preferred. However, some ores may be advantageously cured by oxidising agent concentrations as low as 1 g/L.

Where the ore is one where nickel and/or cobalt is present in a limonite, saprolite or nontronite matrix, and the target metal is nickel and/or cobalt, the curing agent is preferably selected from the group: oxalic acid, citric acid, ascorbic acid and sodium dithionate. Preferably still, the concentration of the curing agent is at least 5 g/L. However, some ores may be advantageously cured by curing agent concentrations as low as 1 g/L.

Where the ore is a nickel and/or cobalt oxide ore, and the target metal is nickel and/or cobalt, the curing agent is preferably provided in the form of ammonia. Preferably, the concentration of the ammonia in the aqueous solution of the curing agent is at least 30 g/L. However, some ores may be advantageously cured by ammonia concentrations as low as 1 g/L.

Where the ore is a vanadium oxide ore, and the target metal is vanadium, the curing agent is preferably provided in the form of carbonate. Preferably, the concentration of the carbonate in the aqueous solution of the curing agent is at least 1 g/L. Preferably still, the concentration of the carbonate in the aqueous solution of the curing agent is between 1 and 50 g/L.

Where the ore is a uranium oxide ore, and the target metal is uranium, the curing agent is preferably provided in the form of carbonate and/or an oxidant. The oxidising agent may be selected from the group: hypochlorite, nitrate, chlorate, perchlorate, hydrogen peroxide, calcium peroxide, ferric, cupric. Concentrations of oxidising agent of at least 20 g/L are preferred. However, some ores may be advantageously cured by oxidising agent concentrations as low as 1 g/L.

Preferably, the concentration of the carbonate in the aqueous solution of the curing agent is at least 1 g/L. Preferably still, the concentration of the carbonate in the aqueous solution of the curing agent is between 1 and 50 g/L.\

Preferably, where the ore is a copper and/or zinc oxide ore where the surface is passivated by the presence of a ferric oxide, the curing agent is an agent that removes ferric oxide. In one form of the invention, the curing agent is oxalic acid/oxalate. Without wishing to be bound by theory, oxalic acid/oxalate dissolves the ferric oxide through the formation of ferric oxalate complex ions.

In an alternative form of the invention, where the ore is a copper and/or zinc oxide ore where the surface is passivated by the presence of a ferric oxide, the curing agent is sodium dithionite. Without wishing to be bound by theory, sodium dithionite works by reducing the ferric oxide to much more soluble ferrous ions.

In both these examples the soluble ions are then transported away from the surface allowing access to the zinc and/or copper oxide mineral(s) by the subsequently applied leaching solution.

Where the ore is a zinc and/or copper oxide ore, in one form of the invention the curing agent is both oxalate and dithionite. In one form of the invention, the curing agent may comprise oxalate, dithionate and ammonia. Without wishing to be bound by theory, ammonia may simultaneously mobilise the target metal(s) to enhance subsequent leaching. In this example the curing solution performs three functions: removal of the non-target metal, iron by both reduction and complexation and mobilisation of the target metal(s).

Where the ore is a zinc/manganese ore containing chalcophane, the curing agent is preferably a reducing agent. The reducing agent of this form of the invention partially or completely mobilises the manganese and zinc thereby resulting in separation allowing selective leaching of zinc during subsequent leaching.

Where the ore is a nickel and/or cobalt ore where the nickel and/or cobalt is present in a limonite, saprolite or nontronite the curing agent comprises a reducing agent. A reducing agent will reduce the ferric iron minerals thereby releasing the nickel and/or cobalt for subsequent leaching.

Curing Agent: Sulfide Ores

Preferably, where the ore is a sulfide ore, the curing agent is an oxidising agent. Advantageously, the concentration of the oxidising agent is matched to the sulfide content of the ore. That is, a low grade sulfide ore will require a lower concentration of oxidising agent than a high grade ore, for the same pore volume.

In one form of the invention, where the ore is a sulfide ore, the oxidising agent is selected from the group: hypochlorite, nitrate, chlorate, perchlorate, hydrogen peroxide, calcium peroxide, ferric, cupric.

Preferably still, the concentration of the oxidising agent in the aqueous solution of the curing agent is at least 1 g/L. Preferably still, the concentration of the oxidising agent in the aqueous solution of the curing agent is at least 5 g/L. Preferably still, the concentration of the oxidising agent in the aqueous solution of the curing agent is at least 10 g/L. Preferably still, the concentration of the oxidising agent in the aqueous solution of the curing agent is at least 20 g/L. Preferably still, the concentration of the oxidising agent in the aqueous solution of the curing agent is at least 30 g/L. Preferably still, the concentration of the oxidising agent in the aqueous solution of the curing agent is at least 40 g/L. Preferably still, the concentration of the oxidising agent in the aqueous solution of the curing agent is at least 50 g/L. Preferably still, when the oxidising agent is hypochlorite the concentration in the aqueous solution of the curing agent is at least 85 g/L.

Preferably, where the ore is a copper sulfide ore and the target metal is copper, the curing agent comprises an oxidising agent and a copper complexing agent.

In one form of the invention, the copper complexing agent may be selected from the group: ammonia, cyanide, thiosulphate, chloride, bromide, phosphate, thiocyanate, EDTA, oxalate, tartrate, acetate, citrate, hydroxide.

Advantageously, the concentration of the copper complexing agent is matched to the copper content of the ore. Preferably, the concentration of the copper complexing agent in the aqueous solution of the curing agent is at least 1 g/L. Where the copper complexing agent is ammonia, the concentration is preferably between 1 and 250 g/L. Preferably still, between 1 and 90 g/L. Where the copper complexing agent is not ammonia, the concentration is preferably between 1 and 100 g/L.

As would be understood by a person skilled in the art the level of complexant in the curing solution would be matched to the level of target metal in the ore. A low grade ore would require a lower concentration of complexant than a high grade ore.

In a preferred form of the invention, where the ore is a copper-gold ore containing native copper and/or copper sulfide and the target metals are copper and gold, the curing agent is ammonia and an oxidant. Preferably still the ammonia concentration of the aqueous solution of the curing agent is at least 30 g/L. Preferably still the sodium hypochlorite concentration of the aqueous solution of the curing agent is at least 5 g/L. However, some ores may be advantageously cured by oxidising agent concentrations as low as 1 g/L.

Where the ore is a copper-gold ore containing native copper and/or copper sulfide and the target metals are copper and gold, preferably the leaching solution would contain a soluble cyanide in addition to free ammonia. Preferably still the sodium cyanide concentration of the leaching solution is at least 0.1 g/L. Preferably still the ammonia concentration of the leaching solution is at least 5 g/L.

Preferably, where the ore is a zinc sulfide ore and the target metal is zinc, the curing agent comprises an oxidising agent and a zinc complexing agent.

In one form of the invention, the zinc complexing agent may be selected from the group: ammonia, cyanide, thiosulphate, chloride, bromide, phosphate, thiocyanate, EDTA, oxalate, tartrate, acetate, citrate, hydroxide.

Advantageously, the concentration of the zinc complexing agent is matched to the zinc content of the ore. Preferably, the concentration of the zinc complexing agent in the aqueous solution of the curing agent is at least 1 g/L. Where the zinc complexing agent is ammonia, the concentration is preferably between 1 and 250 g/L. Preferably still, between 1 and 90 g/L. Where the copper complexing agent is not ammonia, the concentration is preferably between 1 and 100 g/L.

As would be understood by a person skilled in the art the level of complexant in the curing solution would be matched to the level of target metal in the ore. A low grade ore would require a lower concentration of complexant than a high grade ore.

Preferably, where the ore is a nickel and/or cobalt sulfide ore and the target metal is nickel and/or cobalt, the curing agent comprises an oxidising agent and a nickel and/or cobalt complexing agent.

In one form of the invention, the nickel and/or cobalt complexing agent may be selected from the group: ammonia, cyanide, thiosulphate, chloride, bromide, phosphate, thiocyanate, EDTA, oxalate, tartrate, acetate, citrate, hydroxide.

Advantageously, the concentration of the nickel and/or cobalt complexing agent is matched to the copper content of the ore. Preferably, the concentration of the nickel and/or cobalt complexing agent in the aqueous solution of the curing agent is at least 1 g/L. Where the nickel and/or cobalt complexing agent is ammonia, the concentration is preferably between 1 and 250 g/L. Preferably still, between 1 and 90 g/L. Where the copper complexing agent is not ammonia, the concentration is preferably between 1 and 100 g/L.

As would be understood by a person skilled in the art the level of complexant in the curing solution would be matched to the level of target metal in the ore. A low grade ore would require a lower concentration of complexant than a high grade ore.

Preferably, where the ore is a molybdenum sulfide ore and the target metal is molybdenum, the curing agent is an oxidising agent and a molybdenum complexing agent.

In one form of the invention, the molybdenum complexing agent may be selected from the group: ammonia, cyanide, chloride, bromide, phosphate, thiocyanate, EDTA, oxalate, tartrate, acetate, citrate, hydroxide. Preferably still, the molybdenum complexing agent is selected from the group: ammonia and cyanide.

Advantageously, the concentration of the molybdenum complexing agent is matched to the molybdenum content of the ore. Preferably, the concentration of the molybdenum complexing agent in the aqueous solution of the curing agent is at least 1 g/L. Where the molybdenum complexing agent is ammonia, the concentration is preferably between 1 and 250 g/L. Preferably still, between 1 and 90 g/L. Where the molybdenum complexing agent is not ammonia, the concentration is preferably between 1 and 100 g/L.

As would be understood by a person skilled in the art the level of complexant in the curing solution would be matched to the level of target metal in the ore. A low grade ore would require a lower concentration of complexant than a high grade ore.

Curing Agent: Other Ores

Combinations of sulfide and oxides of target metal(s) within the same ore would require a combination of curing agents for optimum effect.

In a preferred form of the invention, where the ore is a mixed oxide and sulfide of copper, and the target metal is copper, the curing agent comprises a combination of ammonia and an oxidising agent. The oxidising agent may be selected from the group: hypochlorite, nitrate, chlorate, perchlorate, hydrogen peroxide, calcium peroxide, ferric, cupric. Preferably, the concentration of the ammonia in the aqueous solution of the curing agent is at least 30 g/L. The concentration of the oxidising agent varies with the amount of sulfide present in the ore. For ores containing significant sulfide concentrations, concentrations of oxidising agent of at least 25 g/L are preferred. However, some ores may be advantageously cured by oxidising agent concentrations as low as 1 g/L.

Where the ore contains elemental copper and the target metal is copper, the curing agent is preferably provided in the form of ammonia and an oxidising agent. Preferably, the concentration of the ammonia solution is in excess of 30 g/L. The oxidising agent may be selected from the group: hypochlorite, nitrate, chlorate, perchlorate, hydrogen peroxide, calcium peroxide, ferric, cupric. Preferably, the concentration of the ammonia in the aqueous solution of the curing agent is at least 30 g/L. Concentrations of oxidising agent of at least 20 g/L are preferred. However, some ores may be advantageously cured by oxidising agent concentrations as low as 1 g/L.

Where the ore is a zinc and lead sulphide and/or oxide ore and the target metals are zinc and lead, the curing agent is preferably a combination of an oxidising agent, ammonia and citrate. Preferably, the concentration of the ammonia solution is in excess of 30 g/L. However, some ores may be advantageously cured by ammonia concentrations as low as 1 g/L. The oxidising agent may be selected from the group: hypochlorite, nitrate, chlorate, perchlorate, hydrogen peroxide, calcium peroxide, ferric, cupric. Preferably, the concentration of the ammonia in the aqueous solution of the curing agent is at least 30 g/L. The concentration of the oxidising agent varies with the amount of sulfide present in the ore. For ores containing significant sulfide concentrations, concentrations of oxidising agent of at least 25 g/L are preferred. However, some ores may be advantageously cured by oxidising agent concentrations as low as 1 g/L. For ores containing significant lead concentrations, concentrations of citrate of at least 25 g/L are preferred. However, some ores may be advantageously cured by citrate concentrations as low as 1 g/L. Without wishing to be bound by theory, the oxidising agent may oxidise the sulphide in the ore, ammonia may mobilise the zinc and citrate mobilise the lead to enhance subsequent leaching.

Target Metals

The method of the present invention has application to ores of target metals that form complexes with ammonia, and particular application to ores of target metals that form complexes with carbonate ion.

Target metals known to form complexes with ammonia include: Li, Mg, Ca, Ba, Mn, Fe, Co, Ni, Cu, Cr, Co, Rh, Ag, Tl, Pd, In, Cd, Hg, Pb, Au, Ag, Ir, Pt and Ru.

Target metals known to form complexes with carbonate ion include: Na, Be, Mg, Ca, Sr, Ba, Y, La, Ce, Nd, Sm, Eu, Gd, Tb, Dy, Yb, Am, U, $UO_2$, $NpO_2$, $PuO_2$, Mn, Fe, Co, Ni, Cu, Ag, Hg, MeHg, Tl, $Me_3Pb$, In, Cd, Hg, Pb, Al, $AmO_2$, Er, Hf, Ho, Li, Lu, Np, Pr, Sc, Th, Ti, Tm, and Zr.

The method of leaching of the present invention has particular application to ores of copper, zinc, nickel and/or cobalt, cobalt, uranium, vanadium and molybdenum and ores of these metals which also contain silver, gold or platinum group metals.

The conditions under which the respective ammoniacal complexes form are readily calculable based on data contained in NIST Standard Reference Database 46, NIST Critically Selected Stability Constants of Metal Complexes: Version 6.0, the contents of which are incorporated by reference.
Multiple Target Metals and Recovery of Non-Target Metals The method of the present invention may form part of a process by which metals other than the target metal are recovered. For example, the method of the present invention may be utilised to reduce the copper and/or nickel and/or cobalt concentration of an ore prior to the ore being further processed to recover other metals, such as silver, gold and/or platinum.

Further, the present invention encompasses simultaneously leaching more than one target metal. The target, metals may be separated by the means for metal recovery, such as by solvent extraction, precipitation, ion exchange or cementation. The curing agent will be tailored to reflect the target metals.

In one form of the invention, the ammonium carbonate solution containing free ammonia of the leaching step may further contain a complexing agent. For example, the solution may further contain a complexing agent in the form of cyanide or thiosulphate for the leaching of Cu and Ag or Au.

For example, in one form of the invention, where the target metal is zinc, the curing agent may comprise a first complexing agent and a second complexing agent. In one form of the invention, where the target metals are copper, silver and/or gold, the curing agent may comprise a first complexing agent and a second complexing agent.

Where the ore is a lead-zinc ore and the target metals are lead and zinc, preferably the leaching solution comprises a soluble citrate in addition to free ammonia. Preferably still the citrate concentration of the leaching solution is at least 0.1 g/L. Preferably still the ammonia concentration of the leaching solution is at least 5 g/L.

Where the ore is a lead-zinc-silver ore and the target metals are lead, zinc and silver, preferably the leaching solution comprises a soluble citrate and a soluble thiosulphate in addition to free ammonia. Preferably still the citrate concentration of the leaching solution is at least 0.1 g/L. Preferably still the ammonia concentration of the leaching solution is at least 5 g/L. Preferably still, the thiosulphate concentration of the leaching solution is at least 0.1 g/L.

Where the ore is a lead-zinc-silver ore and the target metals are lead, zinc and silver, preferably the leaching solution comprises a soluble citrate and a soluble cyanide in addition to free ammonia. Preferably still the citrate concentration of the leaching solution is at least 0.1 g/L. Preferably still the ammonia concentration of the leaching solution is at least 5 g/L. Preferably still the cyanide concentration of the leaching solution is at least 0.1 g/L.

Means for Metal Recovery

The means for metal recovery of the present invention may comprise one or more of the following: solvent extraction, ion exchange, precipitation and cementation.

As stated above, where the present invention encompasses simultaneously leaching more than one target metal the target, metals may be separated by the means for metal recovery, such as by solvent extraction, precipitation, ion exchange or cementation. The curing agent will be tailored to reflect the target metals.

Combined Leach and Cure Solutions

In one form of the invention, the step of curing the ore to be leached through the application of a curing agent more particularly comprises curing the ore to be leached through the simultaneous application of a curing agent and a free ammonia solution. In a highly convenient form of the invention, where the target metal is zinc, the curing agent is provided in the form of an aqueous free ammonia solution. Preferably still, the free ammonia concentration of the curing solution exceeds the free ammonia concentration of the ammonium carbonate solution containing free ammonia of the leaching step.

Without wishing to be bound by theory, where the curing step involves simultaneous application of a free ammonia solution, the high ammonia concentration used solubilises the target metal within the pores and transports it towards the surface. Even after curing is concluded, the pores will contain a higher ammonia concentration that the leaching solution thereby giving enhanced diffusion of target metals out of the ore during the step of leaching the cured ore through the application of an ammonium carbonate solution containing free ammonia.

In one form of the invention, after the step of curing the ore to be leached through the application of a curing agent and before the step of leaching the cured ore through the application of an ammonium carbonate solution containing free ammonia, the method of the present invention comprises the step of:
  allowing the mixture of ore and curing agent to rest for a predetermined period.

In a preferred form of the invention, the predetermined period is at least one day.

BRIEF DESCRIPTION OF THE DRAWINGS

The present invention will now be described, by way of example only, with reference to one embodiment thereof and the accompanying drawing, in which:—

FIG. 1 is a schematic flow sheet of a method for leaching one or more target metals from an ore in accordance with the present invention;

BEST MODE(S) FOR CARRYING OUT THE INVENTION

A method 10 for leaching one or more target metals from an ore in accordance with one embodiment of the present invention is now described. A copper oxide ore is used as the basis for this disclosure, metal recovery is by solvent extraction and electrowinning. After appropriate size reduction, the ore is transported to the heap on a conveyor belt. Whilst on the belt the ore is sprayed with a solution containing 68 g/L $NH_3$ and 27 g/L sodium hypochlorite with the aim of infiltrating around 80% of the particle pore volume with solution. The ore is then constructed into one or more heaps. The heap is left to rest for thirteen days to allow the curing solution to work. Without hypochlorite present in the cure the rate of copper leaching is slower, the recovery lower and the consumption of ammonia much higher.

Once the heap has been rested the heap is irrigated sequentially with recirculated PLS solution, then raffinate and finally water, as shown in FIG. 1.

Without wishing to be bound by theory, the purpose of the hypochlorite is to oxidise any remaining sulfide minerals, either copper or other metals, e.g. silver as these minerals require oxidisation for the contained metals to be solubilised in ammoniacal solutions. Similarly, any native silver or copper present in the ore would also require oxidation. There are also likely to be other minerals present which require oxidation but do not add to the value of metal in solution. Not using hypochlorite results in high ammonia consumption implying the presence of organic materials which consume ammonia.

Every ore will have different levels of these oxidant consumers and the optimum addition of hypochlorite needs to be determined for each ore.

After curing 12, the heap is subjected to a leach 14 using PLS containing 11.63 g/L $NH_3$, this solution is recirculated until the copper content is around 5.63 g/L when it is sent to, in this instance a solvent extraction process. Other process options for treating the PLS include, but is not limited to, ion exchange, precipitation and cementation.

Once the heap has been partly leached a second irrigation using the raffinate from SX is used for the second leach 16. This solution contains little copper (0.22 g/L) and is aimed at removing more of the copper remaining in the heap. The percolated solution from this stage is combined with the strong leach runoff and recirculated as PLS.

The final stage 18 is simply a wash with water. This removes most of the remaining soluble copper and ammonia from the heap allowing decommissioning without the need to neutralise as is typically crucial in acid heaps. The wash solution is fed into a PLS pond 20. The major ammonia loss in the plant is due to entrainment in the tailings.

All the runoff from the heap is sent to a single pond where all solutions are mixed. This simplifies the flowsheet as there is no need for separate ponds or any need to reorganise the launders each time the leach is changed from e.g. PLS to raffinate. This also allows a higher copper concentration in the SX plant feed thereby reducing the SX plant size.

EXAMPLES

The present invention will now be illustrated with reference to a number of examples. The examples are only for illustrative purposes and should not be understood to limit the generality of the preceding description of the invention. By way of general comment, the efficacy of the method of the present invention is demonstrated in respect of the ammoniacal leaching of a wide range of target metals from a wide range of sources, including a range of ores (within the broader meaning of the term used in this specification).

1) Sulfide Ores
a. Assorted Sulfide Minerals 0.25 g mineral specimens of a range of sulfide minerals were leached at ambient temperature using 25 mL of 40 g/L ammonium carbonate+20 g/L free ammonia. A second 0.25 g sample of the same specimen was cured at ambient temperature using an aqueous solution of a curing agent in the form of a 0.1 mL of 25 g/L NaClO adjusted to a pH of 5.0. After curing, 25 mL of 40 g/L ammonium carbonate+20 g/L free ammonia at ambient temperature was added to leach the metal of interest.

The table below shows the % recovery into solution of the target metal with and without curing.

| Mineral | 168 h leach | 24 h cure, 4 h leach |
| --- | --- | --- |
| Chalcopyrite | 2.7 | 79.9 |
| Bornite | 6.0 | 87.1 |
| Covellite | 7.1 | 98.5 |
| Sphalerite | 2.6 | >99.5 |
| Pentlandite | 17.0 | 97.4 |
| chalcopyrite ore | 5.0 | >99.5 |
| Chalcopyrite/bornite concentrate | 4.2 | 81.0 |
| Nickel ore 1 | 3.0 | 93.1 |
| Nickel ore 2 | 5.2 | 90.1 |
| molybdenite | 1.0 | >99.5 |

As is immediately apparent, the 24 h cure has effected a remarkable improvement in metal recovery even though the subsequent leach is appreciably shorter (4 h against 168 h).

Similar tests were conducted on comparable samples with different cures at ambient temperature. The table below shows the % recovery of the target metal for two different cures. All samples were cured for 24 h, then leached for 24 h in 40 g/L ammonium carbonate+20 g/L free ammonia, both stages were at ambient temperature.

| Mineral | 90 g/L $NH_3$ | 93 g/L $NH_3$ + 65 g/L $CO_2$ |
| --- | --- | --- |
| chalcopyrite | 4.7 | 6.2 |
| Bornite | 7.6 | 8.4 |
| Covellite | 10.7 | 8.9 |
| Sphalerite | 0.4 | 1.1 |
| pentlandite | 12.9 | 12.6 |

Clearly the first table shows that the most appropriate cure for metal sulfides is one which oxidises the sulfide to release the target metal. The second table shows that curing in complexing solutions does not provide sufficient recovery of metal to be economic.

b. Nickel Concentrate

A 0.25 g sample of nickel concentrate (assayed at 14.6% Ni) comprising pentlandite, violarite and pyrrhotite was leached at ambient temperature using 25 mL of 40 g/L ammonium carbonate+20 g/L free ammonia. After 168 h a total of 17.0% of the total nickel was leached.

The same sample was cured at ambient temperature for 24 h using just enough 25 g/L NaClO adjusted to pH4 to moisten the powder. 25 mL of 40 g/L ammonium carbonate+20 g/L free ammonia was then added. After 4 h leaching at ambient temperature a total of 97.4% of the total nickel was leached.

c. Copper Ore

A black shale hosted chalcopyrite copper ore (3.16% Cu) was cured at ambient temperature using an aqueous solution of a curing agent in the form of a 25 g/L NaClO adjusted to pH4. After 24 h, a leaching solution comprising 40 g/L ammonium carbonate+20 g/L free ammonia was added, within 4 h at ambient temperature >95% of the copper was in solution. Similar leaching conditions without application of the aqueous solution of the curing agent showed <5% copper in solution after 4 h leaching at ambient temperature.

d. Nickel Matte

A nickel matte was leached at ambient temperature for 24 h in 40 g/L ammonium carbonate+20 g/L free ammonia with <10% of nickel being dissolved. After curing at ambient temperature for 1 h in an aqueous solution of a curing agent in the form of 25 g/L NaClO adjusted to pH4, nickel dissolution of >85% was achieved after 2 h leaching at ambient temperature in 40 g/L ammonium carbonate+20 g/L free ammonia.

This example can be compared with the well known Sherritt-Gordon process for nickel matte which dissolves >80% nickel matte in ammoniacal solutions only after 12 h at 150° C. under 10 atm of oxygen pressure.

Clearly, the above examples show that an aqueous solution of a curing agent in the form of an oxidising agent works extremely well for metal sulfide concentrates and ores. It is important to note that both cure and leach stages were carried out at ambient temperature and ambient pressure. The massive increase in solubility of the target metal has previously necessitated ultrafine grinding, followed by an oxidative leaching process at elevated temperature and/or pressure. The examples clearly illustrate the profound potential for energy saving of the methods of the present invention.

2) Oxide Ores
a. Zinc Oxides

The following examples are particularly illustrative of the significant advantages to be gained by tailoring the curing agent to the mineralogy of the ore.

Samples of smithsonite and hemimorphite were leached for 168 h in 40 g/L ammonium carbonate+20 g/L free ammonia, samples were cured in either 90 g/L ammonia or 90 g/L ammonia+65 g/L $CO_2$. The cured samples were then leached in 40 g/L ammonium carbonate+20 g/L free ammonia. The following table shows the % Zn dissolved after 168 h of leaching or 24 h curing+4 h leaching.

|  | Smithsonite | Hemimorphite | Cure/leach |
| --- | --- | --- | --- |
| Uncured | 11 | 20 | —/168 |
| 90 g/L ammonia | 56 | 12 | 24/4 |
| 90 g/L ammonia + 65 g/L $CO_2$ | 31 | >90 | 24/4 | b. Zinc Oxide with Goethite Coating

The following example illustrates the potential advantages of a curing agent in the form of a complexing agent adapted to complex a non-target metal.

A zinc ore containing primarily hemimorphite was found to contain goethite which coated the hemimorphite restricting leaching of zinc to 43% after 24 h. Curing the ore in oxalic acid solution for 24 h prior to leaching resulted in >90% dissolution during otherwise identical subsequent leaching. Without being bound by theory, the oxalate anions formed a soluble complex with the iron from the goethite thereby removing it from the surface of the zinc mineral which was subsequently accessible to the ammoniacal-ammonium carbonate leach solution.

c. Manganese Zinc Ore

The following example illustrates the potential advantages of a curing agent in the form of a complexing agent in the form of a reducing agent.

A zinc ore containing primarily chalcophane, (Zn,Fe,Mn) $Mn_3O_7.3H_2O$ gave 35% zinc dissolution after 24 h in 40 g/L ammonium carbonate+20 g/L free ammonia. Curing the same material using a saturated ascorbic acid solution prior to identical leaching showed >90% zinc dissolution in 24 h. Without being bound by theory, the ascorbic acid reduced the Mn and/or Fe thereby releasing zinc for subsequent leaching using the ammoniacal-ammonium carbonate solution.

d. Oxide Copper Ore

The following example illustrates the potential advantages of two curing agents in the form of a complexing agent and an oxidising agent.

A dolomite hosted malachite ore with minor secondary copper sulfide was column leached using 20 g/L ammonium carbonate+10 g/L free ammonia. Copper recovery achieved was around 75% in 130 days, the ammonia consumption was determined to be 8.3 kg/t ore. A comparable column of the same ore was cured for 3 days by adding 80% of the measured pore volume of a solution containing 65 g/L NaClO+70 g/L $NH_3$. Irrigation of the heap using 20 g/L ammonium carbonate+10 g/L free ammonia achieved 80% copper recovery in 80 days but at an ammonia consumption of <1.0 kg/t ore.

This example shows that the cure solution had three effects, the ammonia consuming material within the ore was denatured, the secondary copper sulfides were oxidised and the rate of recovery was increased by mobilising the copper from within the ore particles and redepositing them closer to the surface.

e. Oxide Copper Ore with Silver Sulfide and/or Native Silver

The following example illustrates the potential advantages of two curing agents in the form of a complexing agent and an oxidising agent and an additional leaching agent to simultaneously recover two metals.

A copper oxide ore (0.71% Cu) also had silver present (18 ppm) as one or more of silver sulfide, native silver and tennantite. A cure solution containing 70 g/L ammonia+25 g/L sodium hypochlorite was impregnated into the ore which was placed into a column and rested for ten days. The column was then leached using a solution containing 20 g/L ammonium carbonate+10 g/L free ammonia+5 g/L sodium thiosulphate. After leaching copper and silver recoveries were both >70%. An identically cured column was leached using a solution containing 20 g/L ammonium carbonate+10 g/L free ammonia, copper recovery was >70% whilst silver recovery was <5%.

Without wishing to be bound by theory, the ammonia in the cure mobilised the copper whilst the hypochlorite oxidised the silver minerals. The ammonia in the leach solution recovered copper from the heap whilst the thiosulphate complexed with the oxidised silver allowing it to be recovered at the same time as the copper.

f. A Zinc and Copper Oxide Ore

The following example illustrates the importance of matching the curing agent to the mineralogy of the target metals, selection resulting in enhanced separation or coextraction.

0.25 g samples of a zinc-copper oxide ore (2.91% Zn, 0.267% Cu) were cured for 24 h at ambient temperature using 0.1 mL of a range of different agents. After curing 25 mL of a leach solution containing 40 g/L ammonium carbonate+20 g/L was added. After 24 h leaching the zinc and copper recoveries were as shown in the following table. The recoveries for uncured ore are also included.

| cure solution | % Zn leached | % Cu leached |
| --- | --- | --- |
| Saturated EDTA | 64 | 26 |
| Saturated sodium sulphite | 54 | 16 |
| Saturated ascorbic acid | 52 | 24 |
| Saturated oxalic acid | 99 | 87 |
| Saturated sodium dithionite | 60 | 16 |
| Saturated citric acid | 87 | 72 |
| 93 g/L $NH_3$ + 65 g/L $CO_2$ | 53 | 14 |
| 90 g/L $NH_3$ | 53 | 13 |
| Uncured | 51 | 14 |

Clearly, several of the cures had little effect on either zinc or copper recoveries. Some cures did not work equally well for zinc and copper with saturated ascorbic acid almost doubling copper recovery whilst zinc recovery remained the same as the uncured sample. The oxalic acid is clearly the best cure for this ore as both zinc and copper recoveries were substantially improved.

This example shows that a single curing agent will have different effects on different metals in a polymetallic deposit. The selection of the cure may be made on the basis of wanting a separation of metals where one metal is a target but a second, non-target metal is also rendered soluble to the ammoniacal leach solution.

For such systems it may be necessary to have more than one curing agent to allow recovery of both metals.

g. High Grade Smithsonite Ore with Goethite Coating

The following example illustrates the potential for using a high free ammonia concentration in the leaching stage which was matched to the rapid rate of dissolution of the mineral and the desire to maximise the metal concentration in the leaching solution.

A high grade smithsonite ore (18.2% Zn) was cured using a 5 g/L oxalic acid solution. Subsequent leaching in 115 g/L ammonium carbonate+43 g/L free ammonia resulted in 81% zinc dissolution in 0.5 h and >99.5% dissolution in 2 h. The final solution concentration of zinc was 38.5 g/L making it a very high tenor feed to subsequent separation and recovery processes.

Modifications and variations such as would be apparent to the skilled addressee are considered to fall within the scope of this invention.

The claims defining the invention are as follows:

1. A method for leaching one or more target metals from an ore, the method comprising:
    curing the ore to be leached through the application of an aqueous solution of a curing agent at atmospheric pressure and ambient temperature to produce a cured ore;
    leaching the cured ore at atmospheric pressure and ambient temperature through an application of an ammonium carbonate solution containing free ammonia to produce a pregnant leach solution; and
    passing the pregnant leach solution to a metals recovery operation.

2. A method according to claim 1, wherein curing the ore to be leached through the application of an aqueous solution of a curing agent comprises substantially retaining the curing agent in contact with the ore to be leached when the ammonium carbonate solution containing free ammonia is applied.

3. A method according to claim 1, wherein curing the ore to be leached through the application of an aqueous solution of a curing agent saturates at least 50% of a pore space of the ore with the aqueous solution of the curing agent.

4. A method according to claim 1, wherein an ammonium carbonate concentration of the ammonium carbonate solution containing free ammonia is at least 5 g/L.

5. A method according to claim 1, wherein a free ammonia concentration of the pregnant leach solution contains only a slight excess of free ammonia over that necessary to retain the target metal in solution.

6. A method according to claim 1, wherein curing the ore to be leached through the application of an aqueous solution of a curing agent to produce a cured ore comprises:
    curing the ore to be leached through the application of a first aqueous solution of a first curing agent; and
    further curing the ore to be leached through the application of a second aqueous solution of a second curing agent.

7. A method according to claim 1, wherein a volume of the aqueous curing agent applied to the ore to be leached is based on: a texture of the ore, a residence time; a concentration of the aqueous curing agent, or one or more leach conditions.

8. A method according to claim 1, wherein a volume of the aqueous solution of the curing agent applied to the ore is sufficient only to moisten the ore.

9. A method according to claim 1, wherein at least one target metal is cobalt, and the curing agent is a reducing agent.

10. A method according to claim 1 wherein at least one target metal is copper and the curing agent is an oxidizing agent.

11. A method according to claim 10, wherein the oxidizing agent is selected from the group consisting of hypochlorite, nitrate, chlorate, perchlorate, hydrogen peroxide, calcium peroxide, ferric, and cupric.

12. A method according to claim 10, wherein the curing agent is hypochlorite.

13. A method according claim 1, wherein at least one target metal is zinc and the curing agent is a zinc complexing agent.

14. A method according to claim 13, wherein the curing agent comprises ammonia.

15. A method according to claim 1, wherein at least one target metal is zinc and the curing agent is a reducing agent.

* * * * *